(12) United States Patent
Pelkey

(10) Patent No.: US 8,881,679 B1
(45) Date of Patent: Nov. 11, 2014

(54) DEVICE FOR AIDING MALE DOGS USING DOG TRAINING PADS

(76) Inventor: John H. Pelkey, Akutan, AK (US)

( * ) Notice: Subject to any disclaimer, the term of this patent is extended or adjusted under 35 U.S.C. 154(b) by 394 days.

(21) Appl. No.: 13/424,636

(22) Filed: Mar. 20, 2012

(51) Int. Cl.
*A01K 15/00* (2006.01)
*A01K 29/00* (2006.01)

(52) U.S. Cl.
USPC ........................................... 119/161

(58) Field of Classification Search
USPC ........... 119/161, 165, 169, 706; 4/222.1, 293, 4/294, 301, 309–311, 144.1
IPC .................................. A01K 15/02,29/00, 15/00
See application file for complete search history.

(56) References Cited

U.S. PATENT DOCUMENTS

| | | | | |
|---|---|---|---|---|
| 181,265 A * | 8/1876 | Hodges | ............................... | 4/287 |
| 1,916,357 A * | 7/1933 | Brownstein | .................... | 4/222.1 |
| 2,230,861 A * | 2/1941 | Buehler | ......................... | 119/161 |
| 3,230,929 A * | 1/1966 | Thomas | ......................... | 119/161 |
| 4,134,162 A * | 1/1979 | Sharland et al. | ................... | 4/292 |
| D307,201 S * | 4/1990 | Gold | ............................. | D30/161 |
| 6,079,363 A * | 6/2000 | MacLaine | ...................... | 119/161 |
| 8,127,717 B1 * | 3/2012 | Trodella | ......................... | 119/161 |
| 8,225,748 B2 * | 7/2012 | Crawford | ...................... | 119/161 |
| 2004/0266312 A1 * | 12/2004 | Oren et al. | ..................... | 446/227 |
| 2005/0263096 A1 * | 12/2005 | Mita et al. | ..................... | 119/706 |
| 2006/0156992 A1 * | 7/2006 | Costa | ............................. | 119/161 |
| 2006/0191488 A1 * | 8/2006 | Ricchiuti | ....................... | 119/161 |
| 2011/0265374 A1 * | 11/2011 | Tompkins, IV | ................ | 47/31.1 |
| 2011/0296603 A1 * | 12/2011 | Scotland | ........................... | 4/484 |
| 2013/0185857 A1 * | 7/2013 | Worth et al. | ....................... | 4/294 |

* cited by examiner

Primary Examiner — Shadi Baniani
(74) Attorney, Agent, or Firm — Michael J. Tavella

(57) ABSTRACT

A device that can be used with training pad for male dogs. It uses a flat training pad as a base, an inner cone-shaped form, a second training pad, positioned over the form and a cage that fits over the pad and form. The assembled device creates an upright target for the male dog, making urinating as natural as being outdoors.

7 Claims, 5 Drawing Sheets

DEVICE FOR AIDING MALE DOGS USING DOG TRAINING PADS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to dog training pads and particularly dog training pads for male dogs.

2. Description of the Prior Art

Dog training pads have been in use for many years. A training pad for dogs is basically an absorbent mat that placed of a floor so that a dog can urinate and defecate on the pad. They can be used to housebreak puppies. These pads are available in the standard size of 21" X 22", or the larger size of 28" X 30"made with an absorbent material on the front, with a plastic backing. They are also often used for the convenience of people who live in apartments or other locations, in which it may be difficult to let the dog go outside for relief. Many working people also use the pads to provide their dog a place for relief while they are gone.

Although these pads are a great improvement over newspapers, that are laid flat. While easy for female dogs, male dogs are more likely to have problems using them as they have a natural instinct to lift their legs when urinating. Thus, there is no vertical target for male dogs to use when a flat pad is laid out.

BRIEF DESCRIPTION OF THE INVENTION

The instant invention overcomes these difficulties. It is a device that can be used with training pad for male dogs. It uses a flat training pad as a base, an inner, plastic, cone-shaped form, a second training pad, positioned over the form and a stainless steel wire cage that fits over the pad and form. The assembled device creates an upright target for the male dog, making urinating as natural as being outdoors.

DETAILED DESCRIPTION OF THE INVENTION

Figure 1:
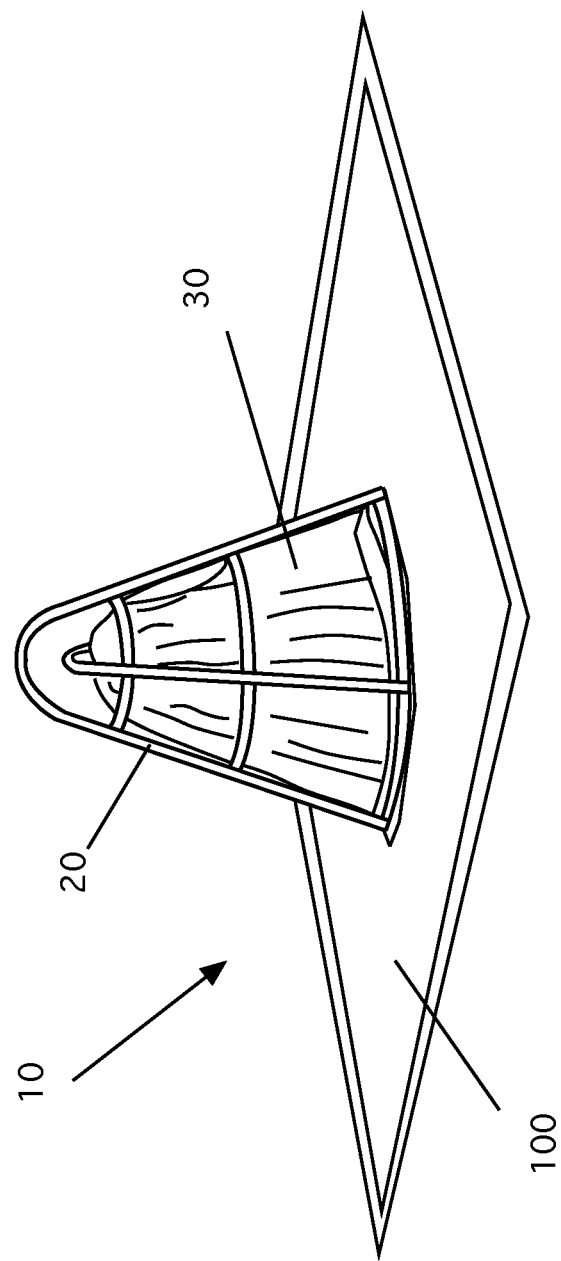
FIG. 1 is a perspective view of the assembled invention.

Referring now to FIG. 1, a perspective view of the assembled invention 10 is shown. The invention 10 sits on standard training pad 100. It is normally placed in the center of the pad 100 as shown. The invention 10 has an outer cage 20 that covers an inner pad 30 that is place over a formed frustum of a cone 40 (see FIG. 3) that acts as an inner form for the device. Once in place, the dog can utilize the invention fro urination in a normal manner. The cage can then be removed for cleaning. The inner pad and bottom pad can then be removed and disposed of. Once that is done, the device can be reassembled, as discussed below, for another use.

Figure 2:
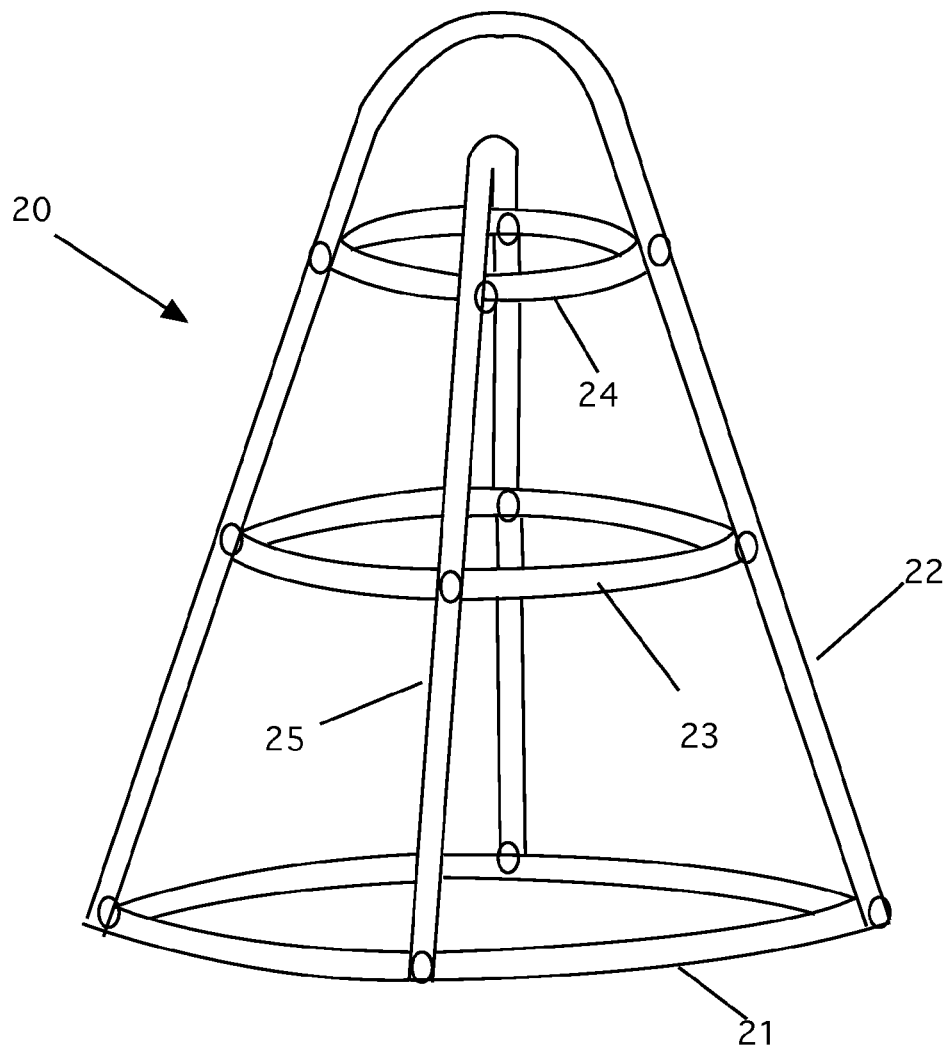
FIG. 2 is a front view of the outer cage.
Figure 3:
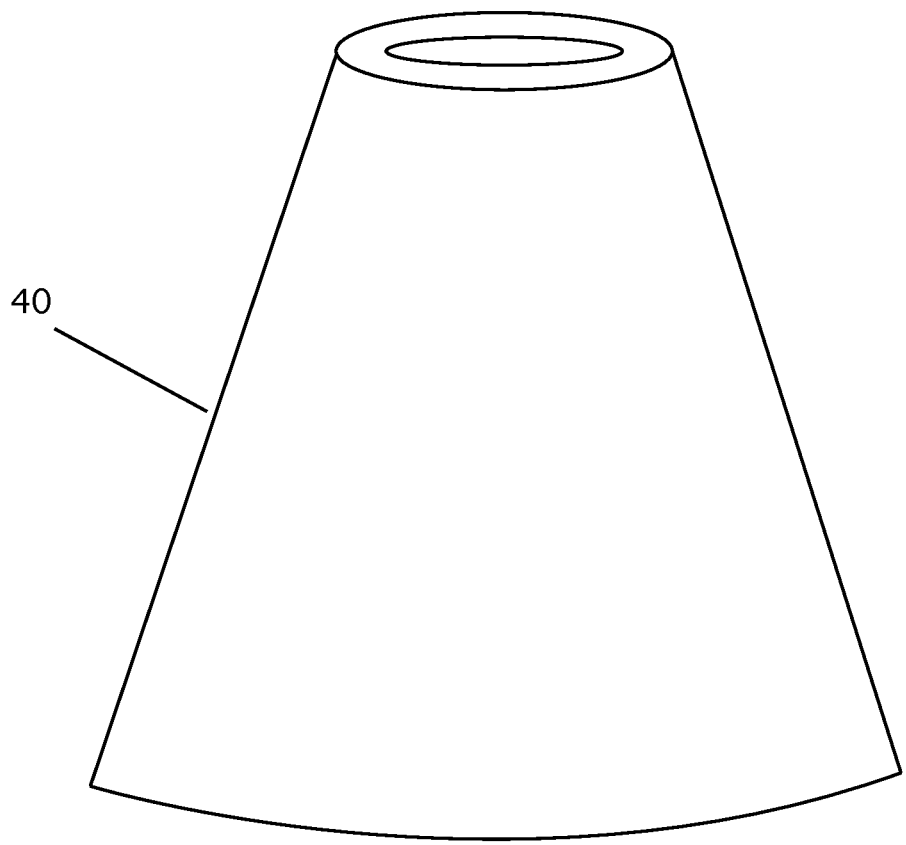
FIG. 3 is a front view of the inner form.

FIG. 2 is a front view of the outer cage 20. In the preferred embodiment, the standard size unit has an outer cage 20 is made of stainless steel wire shaped to fit over the plastic cone. In the preferred embodiment, the cage has a bottom ring 21 6 inches in diameter, the cage has a "high" brace 22 that is tapered from bottom to a width of 2⅝" at the top. The height of the "high" brace 22 is 12½ inches. The cage also has stainless steel rings, spaced and welded at 4-inch intervals; the middle ring 23 is 5" in diameter, and the top ring 24 is 3" in diameter. The cage 20 also has a "low" brace member 25 that is positioned orthogonal to the high brace and is also tapered as shown. All of the rings are welded to the braces at their connection points FIG. 3 is a front view of the inner form 40. In the preferred embodiment, this form is made of plastic and is tapered from a 6-inch diameter bottom to a 2½-inch top. The form 40 has a total height of 9 inches. Preferably, the form is hollow inside and has a wall thickness of ¼-inch.

Figure 4:
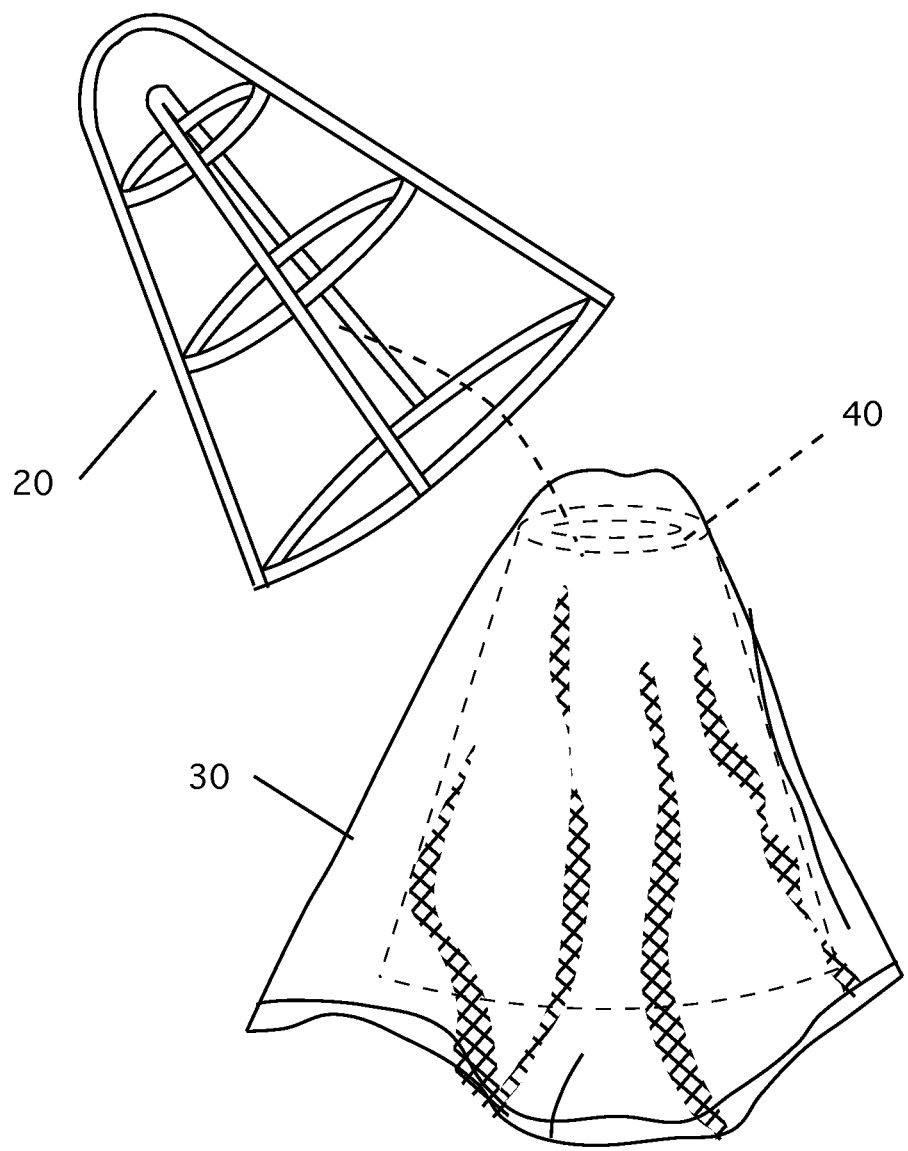
FIG. 4 is an exploded view of the covered form with the cage in position above it.
Figure 5:
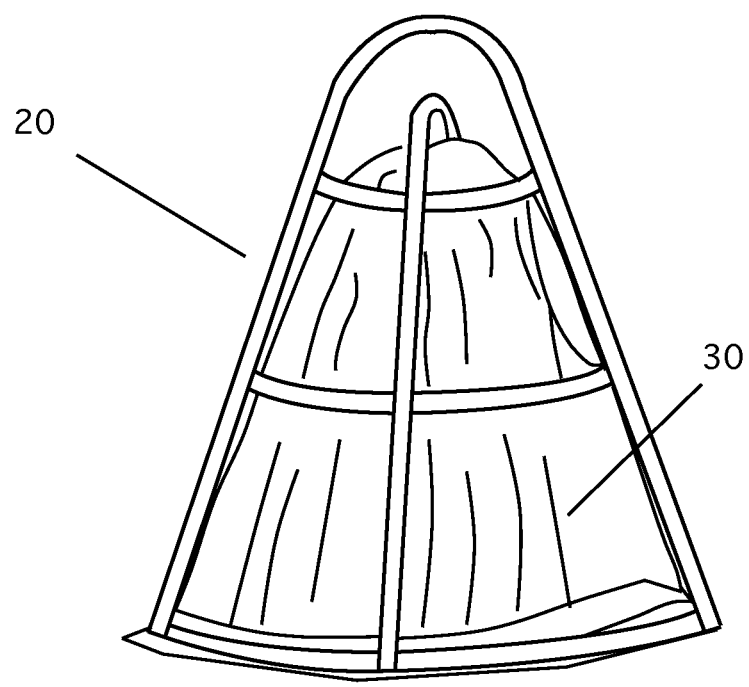
FIG. 5 is a detail view of the covered form with the cage in place.

FIG. 4 is an exploded view of the covered form 40 (in dashed lines) with the cage 20 in position above it. To use the device, first place a flat pad on a flat surface (see FIG. 1). Next place the form 40 on the flat pad. Then, cover the flat pad with a second pad 30 as shown. Finally, place the cage 20 over the covered pad. FIG. 5 is a detail view of the covered form with the cage in place. In this figure, the covered form with pad 30 is shown with the cage 20 in place. Now the pet can use the pads and when done, the pads can be removed and disposed of and the cage can be quickly cleaned, to be ready for its next use.

Although the preferred embodiment uses stainless steel and plastic, the form and cage can be made of other materials such as polymers, nylon, vinyl, acrylics and rubber.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for aiding male dogs using dog training pads comprising:
    a) a tapered inner form;
    b) a training pad, positioned over the form; and
    c) a cage that fits over the training pad and tapered inner form; wherein the cage comprises: a) a lower ring; b) an outer frame member, attached to said lower ring, having a height; c) an inner frame member, attached to said lower ring, and having a height and further wherein the height of the inner frame member being less than the height of the outer frame member, and further wherein the inner frame member is positioned orthogonally to said outer frame member; d) a first intermediate ring, positioned above said lower ring and being attached to said inner flame member and said outer flame member; and e) a second intermediate ring, positioned above said first intermediate ring and being attached to said inner frame member and said outer frame member.

2. The device of claim 1 further comprising a second training pad, placed flat and being positioned under the tapered inner form.

3. The device of claim 1 wherein the tapered inner form is the frustum of a cone.

4. The device of claim 1 wherein the cage is made of stainless steel.

5. The device of claim 1 wherein the tapered inner form is made of plastic.

6. The device of claim 1 wherein said tapered inner from is made of a material selected from the group of polymers, nylon, vinyl, acrylic and rubber.

7. The device of claim 1 wherein said cage is made of a material selected from the group of polymers, nylon, vinyl, acrylic and rubber.

\* \* \* \* \*